United States Patent [19]

Ferret et al.

[11] 4,132,862

[45] Jan. 2, 1979

[54] DEVICE FOR THE DIGITAL MULTIPLEXING OF QUASI-SYNCHRONOUS TRAINS

[75] Inventors: François Ferret, Longjumeau; Pierre Doussoux, Paris; Yvon Le Nen, St Germain les Arpajon, all of France

[73] Assignee: Compagnie Industrielle des Telecommunications Cit-Alcatel, Paris, France

[21] Appl. No.: 857,842

[22] Filed: Dec. 5, 1977

[30] Foreign Application Priority Data

Dec. 3, 1976 [FR] France ............................ 76 36514

[51] Int. Cl.² .............................................. H04J 3/06
[52] U.S. Cl. ............................................. 179/15 AF
[58] Field of Search .......... 179/15 AF, 15 BV, 15 BS, 179/15 BY, 15 BA; 178/69.1

[56] References Cited

U.S. PATENT DOCUMENTS

| | | | |
|---|---|---|---|
| 3,569,631 | 3/1971 | Johannes et al. | 179/15 AF |
| 3,742,145 | 6/1973 | Clark et al. | 179/15 AF |
| 4,002,844 | 1/1977 | Doussoux | 179/15 AF |
| 4,058,683 | 11/1977 | Fenoglio | 179/15 AF |
| 4,072,826 | 2/1978 | Aveneau | 179/15 AF |

*Primary Examiner*—Thomas A. Robinson
*Attorney, Agent, or Firm*—Sughrue, Rothwell, Mion, Zinn and Macpeak

[57] ABSTRACT

A device for multiplexing n quasi-synchronous digital trains into one digital train at least n times faster, with a rate of Fs, comprises n channel elements for synchronizing together the quasi-synchronous trains by the addition of extra bits called "justification bits", and a multiplexing element for delivery, from the synchronized trains, the multiplex train (T) (rapid) formed by successive frames. According to the invention, the multiplexing element supplies to each channel element a signal SJ constituted by a pulse Fs/n at each of the places except for the last place, provided in the train synchronized at the frame frequency of the multiplex train and by a pulse covering this latter location and maintained up to the beginning of the following frame and each channel element comprises means for ensuring, on differentiated edges of the signal SJ the insertion of justification indications, of value 1 or 0 according to whether there is or is not a request for justification in the synchronized train.

6 Claims, 8 Drawing Figures

DEVICE FOR THE DIGITAL MULTIPLEXING OF QUASI-SYNCHRONOUS TRAINS

1. Field of the Invention

The present invention comes within the field of digital transmission. It relates more particularly to the multiplexing of digital signals belonging to n distinct trains, called incoming trains, for forming a single digital train called the outgoing train.

2. Background of the Invention

The principle of digital multiplexing is known: n incoming digital trains, having the same rate and conveyed by n distinct channels, called incoming channels, are time multiplexed to form an outgoing digital train, at a rate which is n times higher than that of the incoming trains, and which is conveyed by a single channel called the outgoing channel.

In practice, these incoming trains are often quasi-synchronous, i.e. they have respective rates identical to each other to the nearest tolerance: they are controlled by independent clocks, not synchronized together, having the same rated frequency Fe and having possible variations of $\pm \Delta Fe$ about this rated frequency. In this case, the multiplexing of the incoming trains requires prior synchronisation of these incoming trains. This synchronisation is, in a known way, obtained by assigning to all the incoming trains a slightly higher rate than the highest rate of these incoming trains. The difference between the real rate of each incoming train and the higher rate which is assigned to it is compensated by the incorporation in the outgoing train of extra bits called, and designated hereinafter, stuffing bits or justification bits J.

On the reception of the outgoing channel, the demultiplexing device must be able to recognize the justification bits inherent to each of the incoming trains and to extract them for the correct restitution of the initial incoming trains. To do this, it is known to impart to the outgoing train a precisely defined configuration according to which the justification bits which are inserted when necessary therein are only inserted at precisely defined locations which are "announced" by extra data also inserted in the outgoing multiplex train at other defined locations. This extra data is significant of the presence or of the absence of justification bits at the corresponding locations which they can occupy; it is designated hereinafter as justification indication data, or simply justification indications IJ.

Therefore a precise configuration or structure is imparted to the outgoing train. The outgoing train is organized in successive frames, each identifiable by a particular word called the frame locking word and each divided into a given number of sections of same length, i.e. comprising a same number of bits, these bits being in order.

For a clear definition and better understanding, FIG. 1 illustrates, by way of example, a frame structure of an outgoing train with a rate of 8.448 M bits/s (frequency Fs of 8.448 MHz) coming from the multiplexing of four incoming trains with a nominal rate of 2.048 M bits/s (nominal frequency Fe of 2048 MHz). All the frames of the outgoing train have the same organisation. The frame is constituted by a set of 848 ordered bits and is divided into four sectors Sa to Sd, each of 212 bits.

The first sector Sa begins with a frame synchronising word VT, of ten bits length, the same word VT is used for the beginning of each frame; it is followed by two bits called service bits BS with together with the frame locking word VT form a frame identification character CI. The 200 bits which follow in the sector Sa come from the bit multiplexing (interlacing) of the four incoming trains.

The sectors Sb, Sc and Sd each begin by four bits of justification indication data IJ; in each justification indication IJ, the first bit relates to the first incoming train, the second bit relates to the second incoming train, the third bit relates to the third incoming train and the fourth bit relates to the fourth incoming train, this being apparent from the numbers 1 to 4 assigned to the four locations of the bits of each justification indication IJ. The 208 other bits of the sectors Sb and Sc come from the bit by bit multiplexing of the incoming trains. The 208 other bits of the fourth sector Sd relate to the incoming trains: they are constituted either by justification bits J (if any) which are inserted in the first four places following the justification indication IJ and followed by the bits of the multiplexed trains, or they are constituted exclusively by the multiplexed bits of the incoming trains where the justification indications IJ of the sectors Sb, Sc, and Sd of the frame are significant of the absence of justification. The four locations of the possible justifications bits J appear in FIG. 1 perpendicular to the discontinuous line delimiting their location.

The justification bits, when there are any, relate respectively to the incoming trains; the first of these bits relates to the first incoming train; the second of these bits relates to the second incoming train, . . ., the fourth of these bits relates to the fourth incoming train; these justification bits are merely stuffing bits; they do not belong to the respective incoming trains as actual data. Thus, there is per frame and per incoming train, at the most one justification bit inserted in the outgoing train. When, in one frame, the bits relating to one particular incoming train and belonging respectively to the three justification indications IJ of the sectors Sb, Sc and Sd, are significant of the absence of a justification bit at the location assigned to the justification bit when one exists, that bit belongs to the particular incoming train under consideration. In practice, a majority detection made from these three bits relating to one particular train and belonging respectively to the three justification indications IJ will make it possible to establish whether the bit which is present at the location which is assigned to any possible justification or stuffing bit of the incoming train is a simple justification bit or is a bit belonging to the incoming train.

Finally, in the frame, the first sector Sa comprises 200 bits belonging to the incoming trains, namely 50 per incoming train; the sectors Sb and Sc each comprise 208 bits, namely 52 per incoming train; the sector Sd comprises 207 to 208 bits belonging to the incoming trains, namely 51 or 52 bits per incoming train.

Once this frame structure is defined, it is seen that there exists an equation which defines the rate of the outgoing train or the nominal frequency Fs of the outgoing train clock (multiplexing control clock), from the nominal rate of the incoming trains or from the nominal frequency Fe of the incoming trains and from the number n of incoming trains. This equation is: $Fs\ 32\ nFe + \Delta$, the expression $\Delta$ representing essentially the systematic insertion of the filling bits in each frame of given length (insertion of the words CI and IJ).

In known multiplexing systems of n quasi-synchronous incoming trains carried by n incoming channels, n channel units each receive one incoming train, or slow train, and put them in synchronism by raising the rate and by the adjunction of justification bits; from these synchronised trains a multiplexing unit delivers the outgoing train or multiplex train. The channel units comprise means for effecting the necessary justification in the received slow trains and for inserting the bits of the justification indications in the synchronised trains so that these latter, which arrive at the multiplexing element, will be ready to be multiplexed together, bit by bit (interlacing).

The necessary justification is effected by a phase comparison, at each channel unit, between the clock of the input channel Fe and the clock of the output channel Fs. This comparison generates a justification request which will be validated by a frame synchronisation signal and will then cause the emission of the justification indication bits IJ and of the actual justification bits J, in correspondence with the respective locations which are assigned to them in the frame, so that the different incoming trains will be synchronised.

It is therefore necessary for each of the channel units to receive from the multiplexing unit which includes the time base delivering signals at the frequency Fs:

a clock signal "with holes", corresponding to Fs/n where pulses corresponding to the identification character CI and to the justification indications IJ in each frame have been suppressed, a frame synchronisation signal, i.e. giving the frame frequency of the outgoing train, each pulse being situated at the location of the beginning of frame identification character CI, a signal defining the locations of the justification indications IJ in each frame; and a signal defining the location of a possible justification bit for the incoming channel.

The transfer of the bits from each channel unit to the multiplexing unit and of the preceding signals necessary to each channel unit leads, in particular when all these signals are supplied by the multilexing unit to each channel unit, to the production of a great number of connections between these two types of unit and makes the wiring all the more difficult as the number of incoming channels is high.

To limit the number of connections, for a given number n of incoming channels and hence to enlarge the possibilities of multiplexing, the corporate assignee had designed a device described in U.S. Pat. No. 4,002,844 in which each channel unit comprises means for inserting a justification request signal at a determined location in the corresponding synchronised train, whereas the multiplexing unit comprises means for reading each of the n justification request signals received from the respective channel units and firstly for controlling the insertion in the multiplex train of the justification indications IJ and secondly to allow the corresponding channel element to effect justification where necessary. Thus, in this device, the number of connections between each channel unit and the multiplexing unit is limited to three:

on first connection, the multiplexing unit supplies the channel unit in question with the clock signal "with holes" corresponding to Fs/n, in which the pulses corresponding to the identification character CI and to the justification indications IJ, of each frame, have been suppressed;

on a second connection, the multiplexing unit supplies the channel unit in question with a composite signal containing the frame synchronisation signal and, when a justification is necessary for the incoming channel, an authorization for justification; and on a third connection, the channel unit considered supplies the multiplexing unit with the synchronized digital train including, inserted at the determined location (location of the identification character CI) any request for justification signal.

The synchronised train transmitted on this third connection is still at a low rate, frequency Fs/n; this allows slow logic circuits (TTL logic) to be used.

The present invention proposes a new arrangement of the multiplexing device, for quasi-synchronous incoming trains also comprising channel units and a multiplexing unit, between which the number of connections is also limited (three connections between the multiplexing unit and each channel unit) and also retaining the advantage of generating each synchronised train at a slow rate for transmission to the multiplexing unit. This new arrangement also aims to avoid "two-way dialogue" between each channel unit and the multiplexing unit which leads to the justification indications being inserted by the multiplexing unit, at the request of each of the channel units and to the insertion of a possible justification then being effected by the corresponding channel unit when authorized to do so by the multiplexing unit. The arrangement according to the present invention brings these operations to the level of each of the channel units.

SUMMARY OF THE INVENTION

The present invention therefore provides a device for multiplexing n quasi-synchronous digital trains, called incoming trains Ti, having the same nominal rate Fe and with real rates Fei ($1 \leq i \leq n$) into an outgoing multiplex train with a nominal rate Fs slightly faster than n times the nominal rate of each incoming train, the outgoing train being arranged in successive frame each comprising, at defined locations, a given identification character CI, at least one n-bit justification indication IJ and a possible justification J having at the most one bit per incident train, the device comprising n channel units and one multiplexing unit: the multiplexing unit comprising a time base generating a signal at the frequency Fs of the bits of the outgoing train, a signal HL at the frequency Fs/n and having holes at locations corresponding to the identification character CI and to each justification indication in each frame, this signal HL being transmitted by a first connection of the muliplexing unit to each channel unit; and each channel unit intended to generate a synchronized train T'i supplying the multiplexing unit via a second connection, and comprising a memorizing assembly for the incoming train, controlled for writing by the clock signal of this train, whose frequency is Fei and for reading by a reading signal $HL_1$ deduced from the signal HL which is supplied by the multiplexing unit, to deliver a resulting train T"i, a phase comparator between the signals Fei and $HL_1$, a request circuit for possible justifications controlled by the comparator and an inhibition circuit generating the signal $HL_1$ from the signal HL when there is a justification request; wherein the multiplexing unit also supplies each channel unit, via a third connection, with a signal SJ constituted by a clock pulse of Fs/n corresponding to each justification indication IJ, the pulse corresponding to the last justification IJ of each frame being maintained until the identification character CI of the following frame and wherein each channel unit also comprises a circuit for the restitution of the frame frequency from the signals SJ and HL, a circuit for controlling the inhibition circuit from the signal at the frame frequency, from the signal SJ and from the justification request signal, a circuit for copying the resulting train T"i delivered by the memorization and restitution assembly for the train T'i, controlled by the signal HL and associated with a circuit for inserting the value of each justification indication IJ at the location provided under the control of the signal SJ and of the output signal of the justification request circuit.

An embodiment of the invention is described by way of example with reference to the accompanying drawings.

DESCRIPTION OF THE PREFERRED EMBODIMENT

Figure 2:
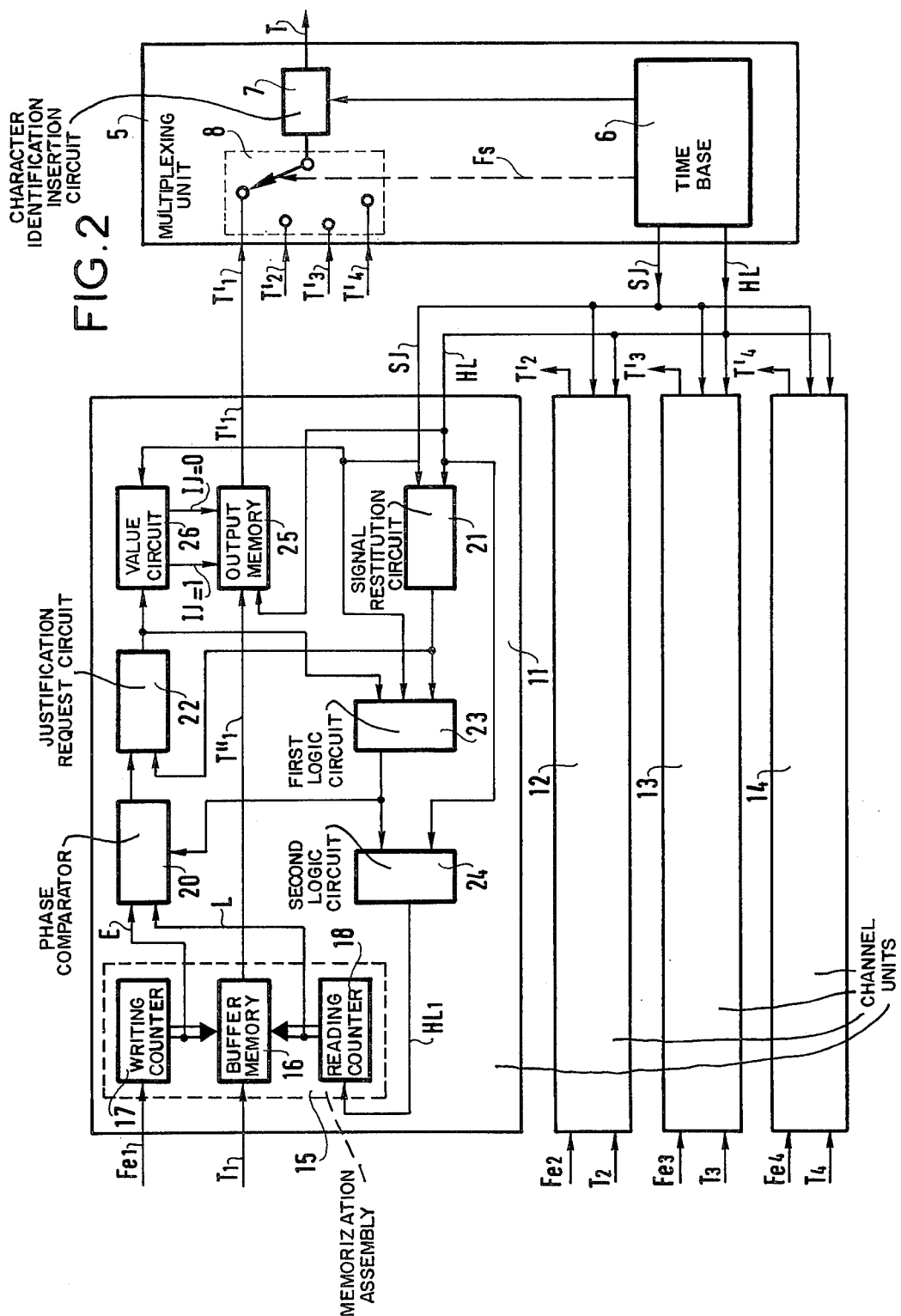
FIG. 2 shows a device in accordance with the invention.

In FIG. 2, four quasi-synchronous incoming trains T1 to T4, with respective rates Fe1 to Fe4, having a nominal value Fe (2.048 MHz) arrive respectively on four channel units 11, 12, 13, 14, which receive clock signals at respective frequencies of Fe1 to Fe4. A multiplexing unit 5 delivers an outgoing train T which is a multiplex of the incoming trains T1 to T4, with a nominal rate Fs (8.448 MHz). The multiplexing unit sends a signal HL and a signal SJ to each channel unit.

The signals HL and SJ are generated in the multiplexing element from a time base 6 including a clock, a chain of dividers associated with circuits for decoding particular states of these dividers and an output logic circuit.

Figure 1:
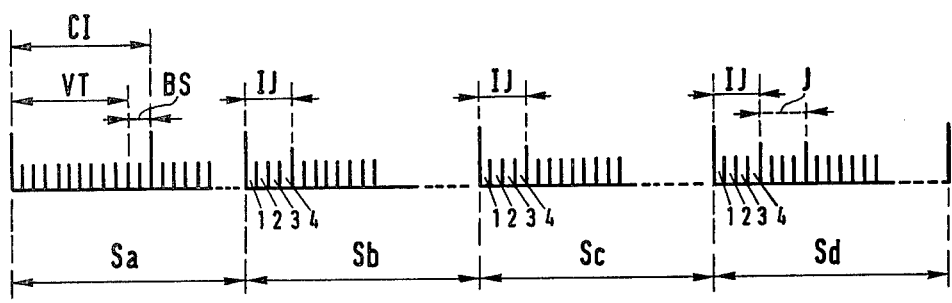
FIG. 1 shows the structure of a frame in an outgoing multiplex train as has been set forth hereinabove.

The signal HL is constituted by pulses at the frequency Fs/4 in which the pulses corresponding to the bits of the identification character CI and to the bits of the justification indications IJ (FIG. 1) have been suppressed. The twelve bits of the frame identification character CI (frequency Fs) correspond to the suppression of three pulses at Fs/4 in the signal HL; likewise, each of the three 4-bit justification indications IJ corresponds to the suppression of one pulse at Fs/4 in the signal HL. The signal HL thus includes a 3-bit "hole" corresponding to the beginning of each frame of the outgoing train and three 1-bit "holes" corresponding to the beginning of each of the last three sectors Sb to Sd of each frame (FIG. 1).

The signal SJ is a composite signal constituted by two suppressed Fs/4 pulses of the clock HL and corresponding respectively to the two justification indications of the second and third sectors of each frame of the outgoing train and of a signal whose leading edge is on the rising edge of the pulse suppressed in HL and corresponding to the justification indication of the fourth sector, while the trailing edge corresponds to the location of each identification character CI of the frame, and is situated substantially at the centre of the character CI.

For example, there will be, in the time base 6 of the multiplexing unit, a clock at Fs≃8.448 MHz followed by a divide-by-4 circuit, then by a divide-by 53 circuit giving the frequency of the sectors. This divide-by-53 circuit is associated with a decoder to allow the positions of the justification indications IJ to be determined in each frame. A second divide-by-4 circuit follows the divide-by-53 circuit and allows signals to be generated at the frame frequency. The signal SJ is constituted by decoding the location of the three justification indications: when the first two locations of the justification indications IJ of each frame are restituted, the third triggers an RS-type flip-flop whose output state is maintained at 1 until the decoding of the next character CI (beginning of the following frame).

The multiplexing unit 5 comprises, besides the time base, a circuit 7 for the insertion of the identification character CI in each frame of the multiplex train T. This circuit 7 is controlled from the time base 6, at the frame frequency of the train T, during twelve pulses Fs. This circuit 7 for the insertion of the identification characters CI receives the output of the multiplexing circuit 8 controlled by the signals Fs to ensure the multiplexing of the trains T'1 to T'4.

Each of the channel units 11 to 14 supplies the multiplexing element 5 with digital trains T'1 to T'4 respectively obtained by the synchronisation of the trains T1 to T4, which have the same rate Fs/4.

FIG. 2 shows the structure of the channel unit 11, that of the other channel units 12 to 14 being identical.

The channel unit 11 comprises a memorization assembly 15 receiving the incoming train T1, whose writing is controlled from the clock pulses of the train Fe1 and whose reading is controlled from reading clock pulses designated by HL1, deduced, as will be seen hereinbelow, from the signal HL delivered by the multiplexing circuit. As schematically shown, it is known to form this memorization assembly 15 by means of a buffer memory 16 which receives the trains T1, of a writing counter 17 which receives the pulses Fe1 and of a reading counter 18 which receives the pulses HL1. These two counters 17 and 18 are advantageously constituted by Johnson modulo-8 counters which supply (on eight outputs symbolized by a double line) eight signals which are shifted in time at the frequency of the clock signals received (Fe1, HL1 respectively). The buffer memory 16 is then constituted by eight D-type flip-flops which each receive the train T1 on their D inputs and are controlled respectively by eight outputs of the writing counter 17. Each of these eight flip-flops is associated to a logic AND gate. This layout allows the writing of the first, then the ninth, then the seventeenth bit . . . of a sequence of the train T1 in the first of these flip-flops, the second then the tenth, then the eighteenth bit . . . in the second of these flip-flops, etc . . ., the data being maintained each time during eight clock instants Fe1. A series-parallel transformation is thus effected. The AND gates, respectively associated with the eight flip-flops and respectively controlled by the eight output signals of the reading counter 18, give at their outputs the value assumed by the flip-flop to which they are each associated, during an interval of time defined by the counter 18. All the signals coming from these AND gates are assembled together by an OR gate which effects a parallel-series transformation and gives at the output the digital train T"1.

A phase comparator 20 with a memory, between the writing control pulses Fe1 and the reading control pulse HL1, receives on a first input the signal E from one of the outputs of the registering counter 17 and on a second input the signal L from one of the outputs of the reading counter 18. These two outputs giving the signals E and L which are compared, are outputs of the same order (E = Fe1/8; L = HL1/8). This comparator 20 makes it possible to detect and register any overlap between a writing signal E and the reading signal L energizing the AND gate associated to the flip-flop receiving this signal E.

The signals HL and SJ coming from the multiplexing circuit are received by a circuit 21 for the restitution of a signal at the frame frequency of the outgoing train T.

A request for justification J circuit 22 is connected to the output of the memory comparator 20. It is controlled by the frame frequency signal delivered by the circuit 21 and then takes into account the state of the comparator throughout the duration of a frame; it determines if there must or there must not be justification in the frame.

The signal delivered by the justification request circuit 22 makes it possible to generate, in a first logic circuit 23 which also receives the signal at the frame frequency coming from the circuit 21 and the signal SJ, an inhibition control signal whose function is to inhibit a pulse of the signal HL when there is a request for justification. The inhibition circuit is constituted by a second logic circuit 24, receiving the signal HL and the control signal received from the first logic circuit 23 to deliver the reading control signal HL1 received by the reading counter 18.

An output memory 25 ensures firstly the copying of the train T"1 and secondly the insertion of the bits of each of the three justification indications IJ in this train and of the justification bit, if need be. This output memory 25 is, for this purpose, connected to the buffer memory 16, which delivers the train T"1; it is also connected to a circuit 26 for the determination of the value and of the location of each of the bits of the justification indications in the train T"1: the value of the justification indications is calculated from the signal received from the justification request circuit 22; their location is defined from the signal SJ. This output memory 25 is also controlled by the signal HL giving it the writing rate and allowing the insertion of a justification in the train: this justification is then effected by repeating the preceding data bit of the train T"1 at the location where the signal HL1 has an extra "hole" in relation to HL. This output memory delivers the synchronized train T'1 applied to the multiplexing circuit 5 with the other trains T'2 to T'4 generated identically from the trains T2 to T4.

Figure 3:
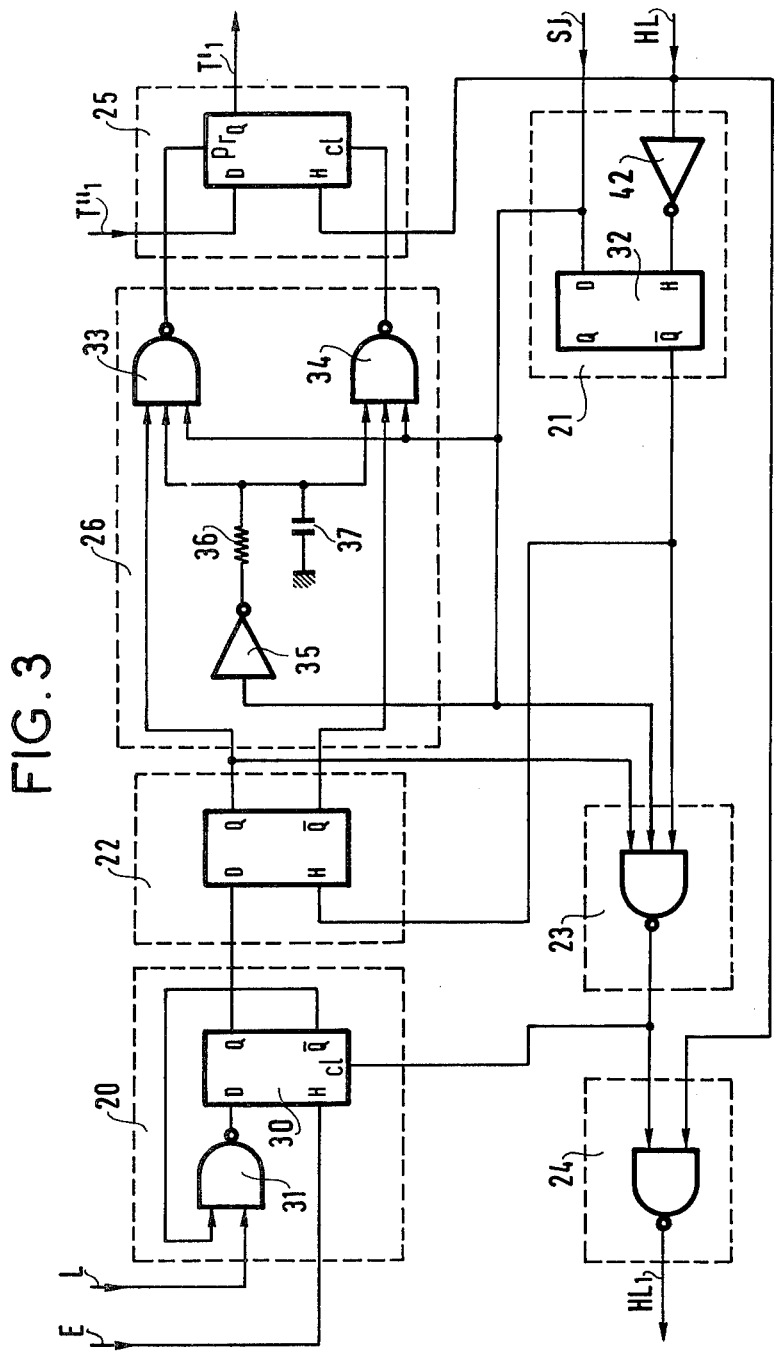
FIG. 3 shows a detailed view of the circuits forming one of the channel units.

FIG. 3 shows in detail the circuits forming the channel unit 11 of FIG. 2, except for the memorizing assembly 15. The operation of these circuits is given with reference to the waveforms given in FIGS. 4 and 5.

The phase comparator 20 with a memory is constituted by a D-type flip-flop 30 receiving on its input at D the output of a logic NAND gate 31 having two inputs, the one receiving the signals L and the other connected to the output $\bar{Q}$ of the flip-flop 30. The clock input H of this flip-flop receives the signal E. Its reset to zero input c1 is connected to the output of the inhibition control circuit 23.

Figure 4:
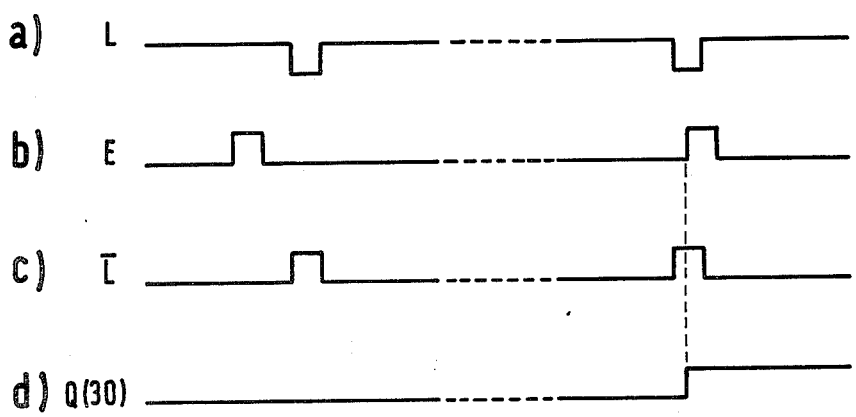
FIGS. 4 (comprised of a–d) and 5 are waveforms showing various time varying signals generated in the device.

The operation of this comparator 20 is illustrated by the waveforms of FIG. 4 in which the waveforms a and b repesent the signal L and the signal E (derived respectively from the signals HL1 and Fe1 energizing the reading and writing counters); only two component pulses have been shown for each of the signals L and E, these pulses corresponding to the two possible configurations giving or not giving rise to a justification.

The signal $\bar{L}$ is shown at c and is combined with the signal Q of the flip-flop 30 to maintain the state assumed by the flip-flop at each clock signal E (FIG. 3, by the NAND gate 31, D = L.$\bar{Q}$ = $\bar{L}$ + Q). It is seen that when there is overlap between two pulses of the signals L and E, the output Q passes to the level 1. The forced resetting to zero of this flip-flop is not taken into consideration in FIG. 4; it will be explained with reference to FIG. 5.

The justification request circuit 22 is also constituted by a D-type flip-flop which receives the signal Q of the flip-flop 30 on its D input and the frame frequency signal delivered by the circuit 21 on its clock input H. The function of this flip-flop 22 is to memorize the Q output of the flip-flop 30 throughout the duration of the frame to come.

The circuit 21 is also formed by a D-type flip-flop 32 receiving on its D input the signal SJ delivered by the multiplexing unit and receiving on its H input the signal $\overline{HL}$ which is applied to it through an inverter 42.

Figure 5:
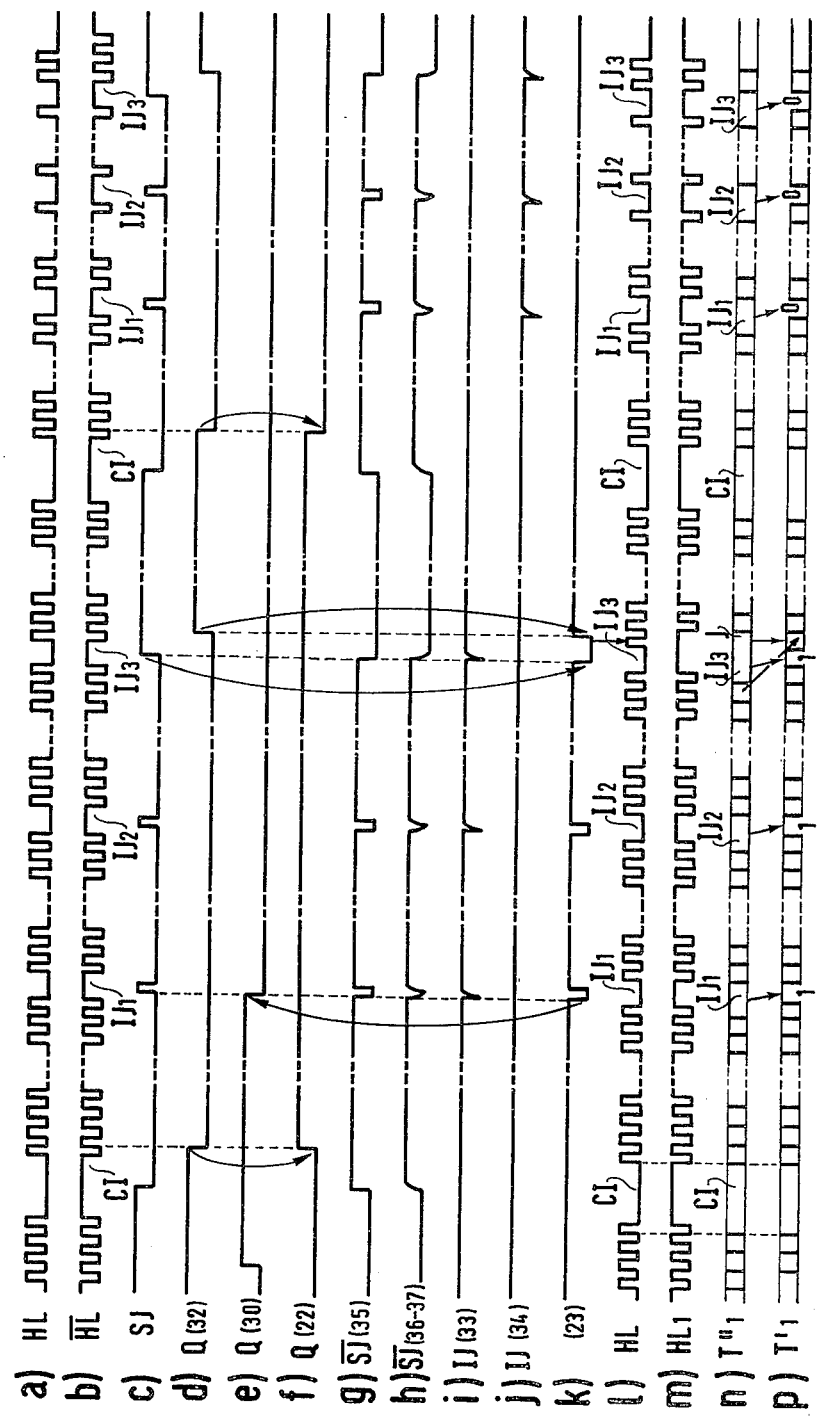

FIG. 5 illustrates:

in waveform a, the signal HL with "holes" coming from the multiplexing unit, the locations of the beginning identification character word CI and of the three justification indicators IJ1, IJ2, IJ3 have been referenced for each frame, in waveform b, the signal HL coming from the inverter 42, in waveform c, the signal SJ coming from the multiplexing unit, in waveform d, the signal Q(32) at the frame frequency, obtained on the output of the flip-flop 32: the output Q(32) changes to the level 1 on the leading edge of the first pulse HL which follows the location of the third justification indication IJ3 and remains at this level 1 up to the leading edge of the first pulse $\overline{HL}$ which follows the identification character word CI of the following frame, on which the resetting to the level 0 is effected, in waveform e, the signal Q(30) given by the phase comparator. The two states which this signal can assume have been illustrated: before the first complete illustrated frame the signal Q(30) is at the level 1 and indicates that an overlap between the pulses L and E is detected (FIG. 4), the signal Q(30) is considered subsequently at zero (no overlap), in the waveform f, the signal Q(22) which corresponds to the writing of the signal Q(30) in the memory 22 by the signal at the frame frequency Q(32). The state 1 of Q(22) corresponds to the registering of a request for justification.

The circuit 26 for determining the value of the position of the justification indications IJ in the train T"1, coming from the memory 16 receiving T1 (FIG. 2), comprises a first NAND gate 33 and a second NAND gate 34, each having three inputs. One of the gates 33 receives the signal SJ and the signal Q(32), the other 34 receives the signal SJ and the signal $\bar{Q}$(32), on two of their three inputs. The third input of each of the gates receives the signal SJ via an inverting gate 35 followed by an integrator circuit RC, 36 and 37. In this circuit 26, the leading edges of the signal SJ are distinguished firstly by means of the gates 35 and 33 when the memory 22 registers a request for justification i.e. Q(22) = 1 and secondly by means of the gates 35 and 34 when the memory 22 does not register any request for justification i.e. $\bar{Q}$(22) = 1.

FIG. 5 shows the operation of the circuit 26 by the waveforms g, h, i and j. $\overline{SJ}$ given by the inverter 35 is shown in g; this same signal $\overline{SJ}$ has been shown at h after its integration in the circuit 36–37. Waveform i shows the control signal for the insertion of the justification indications IJ whose value will be 1, for a registered justification request given by Q(22) = 1, these insertions being made in the train T"1 at locations defined from the positions of the narrow pulses coming from the gate 33. Waveform j shows the insertion control signals for the justification indications IJ whose value would be 0 if there were no registered request for justification given by Q(22) = 0, this insertion being effected in the train T"1 at locations defined from the positions of the narrow pulses coming from the gate 34. These gates 33 and 34 switch the leading edges of the signal SJ according to whether there is or there is not a registered justification.

The memory 25, ensuring the recopying of the train T"1 by inserting therein the possible justification indications IJ and the possible justifications J, is constituted by a D-type flip-flop which receives the train T"1 on its D input and the signal HL1 on its clock input H; its "preset" input Pr for forced setting to 1 is controlled by the signal coming from the gate 23 and its "clear" input cl for forced setting to zero is controlled by the signal delivered by the gate 23. The synchronized train T'1 is delivered on the output Q of this flip-flop 25. The operation of this flip-flop will be described hereinbelow with reference to FIG. 5.

The inhibition control circuit 23 of a pulse of HL (first pulse Hl which follows IJ3) is constituted by a NAND gate having three inputs, which receives in addition to the signal $\overline{Q}(32)$, the signal SJ and the signal Q(22) which indicates whether or not there is a registered justification request.

The inhibition circuit 24 is also formed by a NAND gate which receives HL and the order coming from the gate 23. The inhibition control signal given by the gate 23 is illustrated in the waveform k of FIG. 5; it is constituted by two pulses at the locations IJ1 and IJ2 respectively and by a third pulse when the signal Q(22) is at 1, this third pulse has its leading edge or trailing edge obtained from the leading edge of SJ, while its rear leading edge is on the leading edge of Q(32) when there is overlap between the pulses of the signal SJ and of the signal Q(32). In the signal coming from the gate 23, these three preceding pulses, obtained during a frame, are absent when the signal Q(22) is at 0. This signal applied to the "clear" order of the flip-flop 30 forces its state to zero if this flip-flop was in the state 1, as schematised by the arrow between the first pulse given in waveform k and the passing to zero of Q(30) given in the waveform e.

Waveform 1 shows schematically again the signal HL given in waveform a, to allow the relationship to be established between the signal HL and the signal HL1 which is given by the gate 27 and is illustrated at m. It is seen that HL1 is the copy of HL, with, however, suppression of one pulse, by the third (wide) pulse of the signal of the gate 23 directly following the third justification indication IJ3. This signal HL1 controls the reading counter 18 (FIG. 2) and gives the rate of the train T"1 applied to the output flip-flop 25 which will deliver the synchronized train T'1.

Waveform n shows the train by sequences of small blocks representing the locations of the data bits of the train T1 and having a rate given by HL1. This train T"1 includes "holes" represented in correspondence with the identification character CI word at the beginning of each frame, indications IJ1 to IJ3 of each frame and a justification J if it exists, these "holes" are identified in correspondence by the preceding symbols CI, IJ, and J.

Waveform p shows the synchronized train T'1 obtained on the output 0 of the flip-flop 25 of the clock signal HL. This flip ensures the copying of T"1. Further, by the switching from the gates 33 and 34 of the leading edges of the signal SJ respectively on its "preset" order Pr and on its "clear" order cl according to whether or not there is justification request, the flip-flop is forced to 1 by the pulses of the signal of the gate 33 as appears in waveform i and on the contrary is forced to 0 by the pulses of the signal of the gate 34 as appears in waveform j. This is shown by the insertion of bits "1" and of bits "0" in correspondence in the train T"1, constituting the justification indications.

Further, the clock signal HL of this flip-flop ensures, with respect to the location J in the signal HL1 and the train T"1, the insertion of the actual justification then obtained by the repeating, at this location, the peceding data bit of the train T"1.

It is seen on the contrary with respect to the right-hand frame in FIG. 5, that when a justification request has not been registered, this frame in the train T'1 comprises justification indications with a value of 0; no justification is then inserted in this frame.

The present invention has been described, with reference to the application to the constitution of a multiplex train with a definite rate, from four incoming trains with a nominal rate which is also definite.

This application has been given by way of an example; the invention aplies of course to the multiplexing of any number of incoming trains. The embodiment given with reference to FIG. 3 has also been chosen by way of an example. It is obvious that some circuits can be replaced by other equivalent circuits and/or that details can be modified.

What is claimed is:

1. A device for multiplexing n quasi-synchronous digital trains, called incoming trains Ti, having the same nominal rate Fe and with real rates Fei ($1 \leq i \leq n$) into an outgoing multiplex train with a nominal rate Fs slightly faster than n times the nominal rate of each incoming train, the outgoing train being arranged in successive frames each comprising, at defined locations, a given identification character CI, at least one n-bit justification indication IJ and a possible justification J having at the most one bit per incident train, the device comprising n channel units and one multiplexing unit: the multiplexing unit comprising a time base generating a signal at the frequency Fs of the bits of the outgoing train, a signal HL at the frequency Fs/n and having holes at the locations corresponding to the identification character CI and to each justification indication in each frame, this signal HL being transmitted by a first connection of the multiplexing unit to each channel unit; and each channel unit intended to generate a synchronized train T'i supplying the multiplexing unit via a second connection, and comprising a memorizing assembly for the incoming train, controlled for writing by the clock signal of this train, those frequency is Fei and for reading by a reading signal $HL_1$ deduced from the signal HL which is supplied by the multiplexing unit, to deliver a resulting train T"i, a phase comparator between the signal Fei and $HL_1$, a request circuit for possible justifications controlled by the comparator and an inhibition circuit generating the signal $HL_1$ from the signal HL when there is a justification request, wherein the multiplexing unit also supplies each channel unit, via a third connection, with a signal SJ constituted by a clock pulse of Fs/n corresponding to each justification indication IJ, the pulse corresponding to the last justification IJ of each frame being maintained until the identification character CI of the following frame and wherein each channel unit also comprises a circuit for the restitution of the frame frequency from the signals SJ and HL, a circuit for controlling the inhibition circuit from the signal at the frame frequency, from the signal SJ and from the justification request signal, a circuit for copying the resulting train T"i delivered by the memorization and restitution assembly for the train T'i, controlled by the signal HL and associated with a circuit for inserting the value of each justification indication IJ at the location provided under the control of the signal SJ and of the output signal of the justification request circuit.

2. A device according to claim 1, wherein that said circuit for the insertion of each justification indication IJ is constituted by a circuit sensitive to the edges of the signals SJ to define, in time, the position of each justification indication IJ in the train T"i applied to the copying circuit and a switching circuit for switching one of the two values to be attributed to each justification indication controlled by the signal delivered by the justification request circuit and on the edges of the signal SJ.

3. A device according to claim 2, wherein the circuit which is sensitive to the edges of the signal SJ is constituted by an inverter followed by an RC integrator circuit and the switching circuit is constituted by two NAND gates each receiving the signal SJ and this same signal at the output of said integrator circuit and also receiving respectively, the justification request signal and the inverse thereof.

4. A device according to claim 3, wherein circuit for copying the train T"i and for restitution of the train T'i is constituted by a D-type flip-flop receiving the train T"i on its D input and the signal HL on its clock input and controlled by its preset input Pr for forced setting to 1, and its clear input cl for forced setting to 0, by the signals coming respectively from the two NAND gates of the switching circuit.

5. A device according to claim 1 wherein
the justification request circuit is constituted by a second D-type flip-flop receiving the signal delivered by said phase comparator on its D input and said signal delivered by the circuit for the restitution of the frame frequency on its D input.

6. A device according to claim 1 wherein
said phase comparator is a memory comparator constituted by a third D-type flip-flop, having its D input connected via a NAND gate to receive the signal on its $\overline{Q}$ output and a signal L for reading the memorization assembly, receiving on its clock input a signal E for writing in the memorization assembly and receiving on its clear input cl for forced setting to zero, the signal delivered by the inhibition control circuit.

* * * * *